May 2, 1933.  F. DUPAU  1,906,225
ELECTRICALLY HEATED SOLDERING IRON
Filed April 14, 1932  2 Sheets-Sheet 1
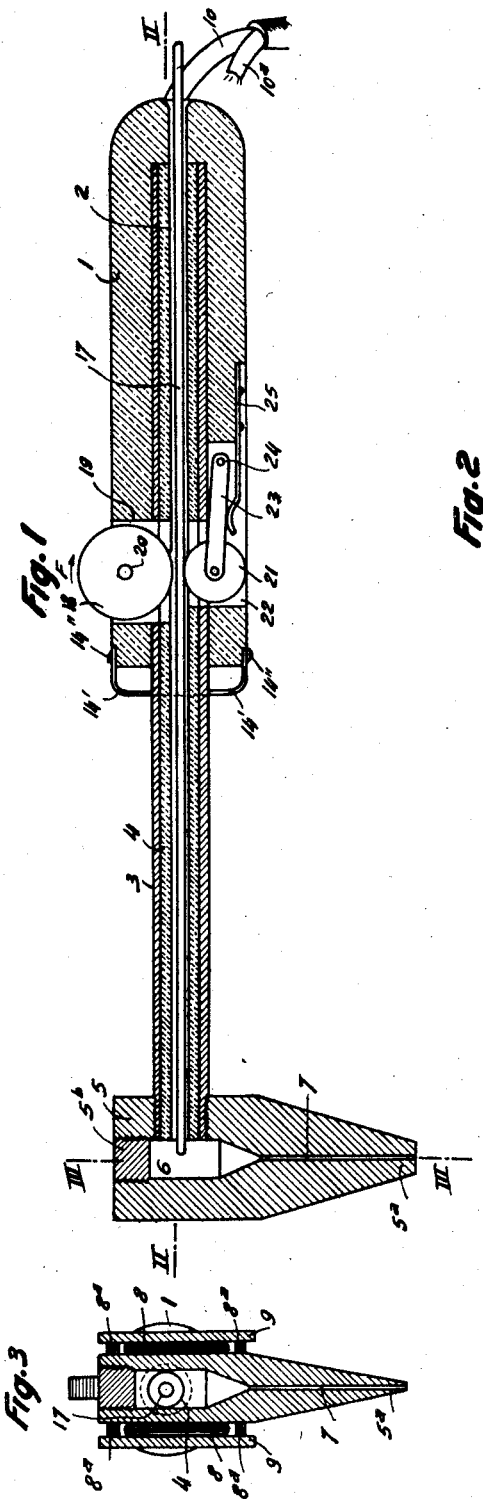
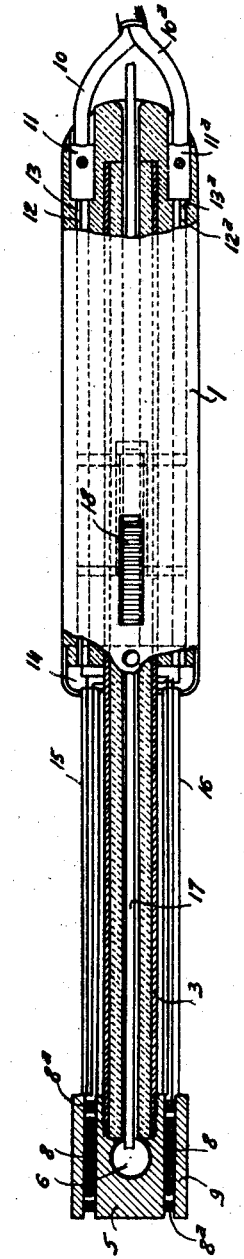
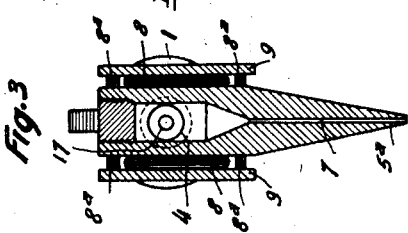
INVENTOR
FERNAND DUPAU
BY
ATTORNEY May 2, 1933.  F. DUPAU  1,906,225
ELECTRICALLY HEATED SOLDERING IRON
Filed April 14, 1932  2 Sheets-Sheet 2
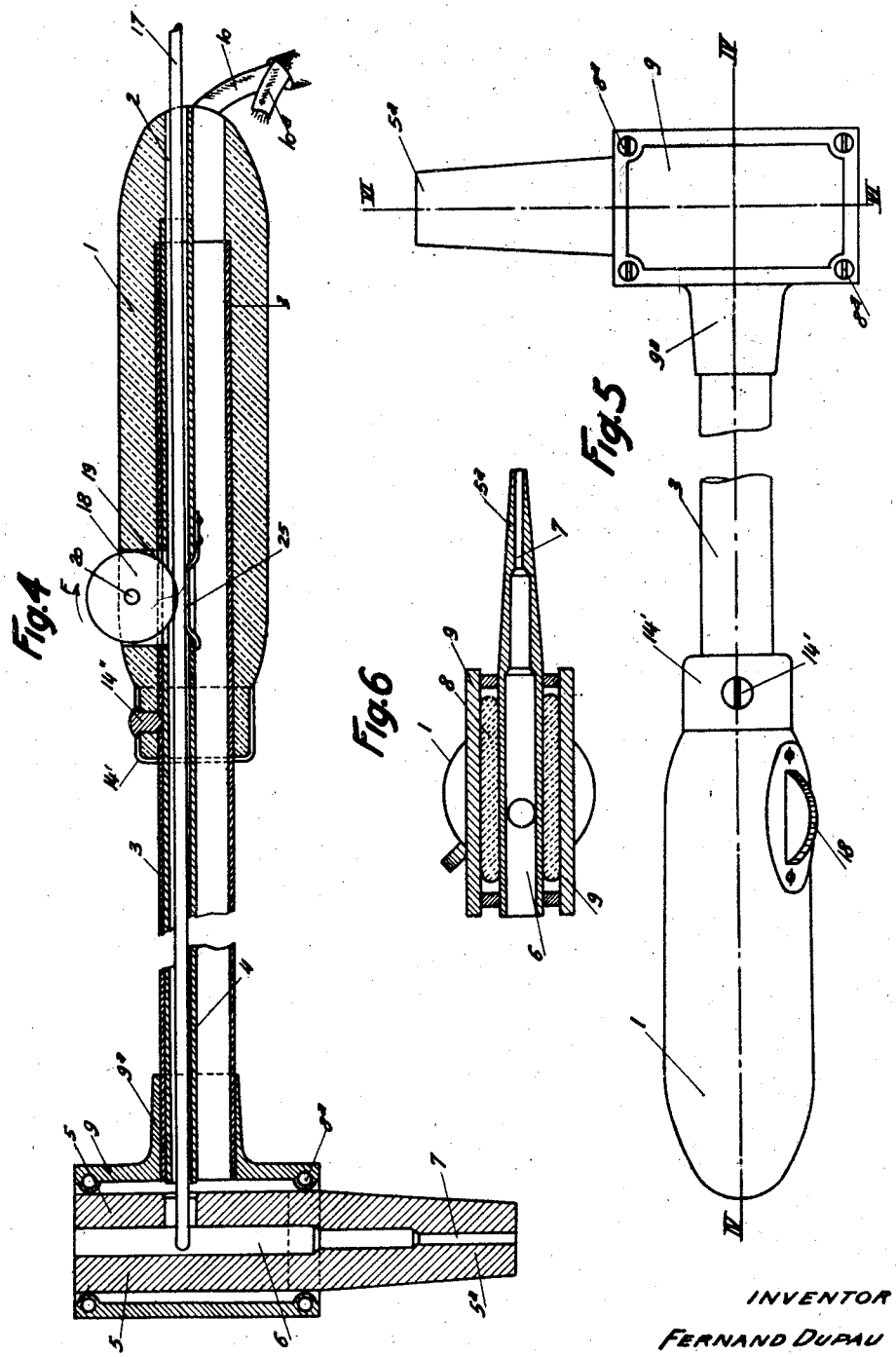
INVENTOR
FERNAND DUPAU
BY
ATTORNEY.

Patented May 2, 1933

1,906,225

UNITED STATES PATENT OFFICE

FERNAND DUPAU, OF PARIS, FRANCE

ELECTRICALLY-HEATED SOLDERING-IRON

Application filed April 14, 1932, Serial No. 605,316, and in France April 15, 1931.

The present invention relates to soldering-irons of the electrically-heated type, its primary object being to provide an improved soldering-iron of this type utilizing solder in wire, strip or cord form, by means of which the operator can, single-handed, apply solder with the desired accuracy to any piece of work for any length of time while having the possibility of strictly regulating the feed of the solder in proportion as it is needed, merely by exerting in a most easy way a small stress with one finger of his hand holding the iron, which obviates any waste or undue scattering of the molten solder while leaving the other hand of the operator entirely free.

A further object of the invention is to provide an electrically-heated soldering-iron of simple, rugged and yet light construction which the operator can manipulate single-handed without becoming unduly tired and without getting his hand holding the iron handle scorched even by prolonged contact with said handle.

A still further object of the invention is to provide an electrically-heated soldering-iron wherein the heat generated by one or more electrical heaters is used with the utmost efficiency for melting the solder in proportion as the latter in wire or cord form enters a recess formed in a block carrying said heaters and formed with the bit, the quantity of heat, i. e. of electric current necessitated to properly operate the soldering-iron, being strictly limited to the required quantity of solder to be applied to the work piece, this limitation being at all times under the easy control of the operator who can perform the whole soldering operation single-handed.

Still a further object of the invention is to provide an electrically-heated soldering-iron wherein the solder in wire or cord form, supplied for example from a spool or reel carried by the handle of the tool, is so thermally sheathed till it is molten as to be protected from premature fusion, which obviates the risk of any breakdown or undue stoppage of the working of the tool due to clogging even after a lengthy soldering operation.

With these and such other objects in view as will incidentally appear hereinafter, the invention is exemplified by the novel construction and arrangement of parts that will now be described with reference to the accompanying drawings forming a part of the present disclosure and wherein:

Figure 1 is a longitudinal sectional view of a soldering-iron constituting a first embodiment of the invention.

Figure 2 is a plan view, partly in section on the line II—II of Fig. 1.

Figure 3 is a transverse sectional view on the line III—III of Fig. 1.

Figure 4 is a longitudinal sectional view on the line IV—IV of Fig. 5 of a soldering-iron constituting a further embodiment of the invention.

Figure 5 is a plan view corresponding to Fig. 4 and showing the oblique arrangement of the solder wire actuating or driving roller.

Figure 6 is a transverse sectional view on the line VI—VI of Fig. 5.

Like reference numerals designate like parts throughout the several views.

As illustrated in Figures 1 to 3, the soldering-iron comprises a handle 1 of round cross-section, made for example of ebonite and formed along its longitudinal axis with a bore 2 in which fits a projecting tube 3 sheathed internally with a tubular lining 4 made of asbestos, mica or other suitable insulating substance.

At the fore end of the tube 3 is screwed a metal block 5 adapted to form the heating mass of the iron and to melt the solder. This block 5 is tapered at one end 5$^a$ to form the bit of the soldering-iron and is hollowed to form an inner recess or fusion chamber 6 which is stopped at one end by a screw-threaded plug 5$^b$ and extends at its opposite end in the form of a duct 7 of small cross-sectional area, the mouth of which is located substantially midway of the width of the bit 5$^a$. The bore 2 of the handle 1 communicates freely with the fusion recess or chamber 6.

The heating of the block 5 is performed by two electrical resistances 8 clamped against its side faces by cheek plates 9 secured to said faces by screws 8ª.

The electrical resistances 8 are fed in parallel by leads 10, 10ª clamped to terminals 11, 11ª (Fig. 2) carried internally by the handle 1. These terminals are connected to conductors 12, 12ª extending through bores 13, 13ª of the handle.

The bores 13, 13ª terminate in a header 14 closed by a cap 14' secured by screws 14'' to the fore end of the handle 1. In the header 14 each of the conductors 12, 12ª extends in the form of two parallel wires respectively sheathed in a pair of tubes 15, 16 located on both sides of the tube 3, and feeds one of the resistances 8.

The soldering-iron thus constructed utilizes solid solder in wire or cord form. The solder wire or cord 17 passes freely through the bore 2 right into the fusion chamber 6. In this chamber, the tip of the solder wire or cord 17 is melted by radiation from the metal block 5 heated by the resistances 8. The molten solder flows automatically through the duct 7 formed in the bit 5ª whence it can be spread or applied in spot, tack or line form upon the work piece to be soldered. The cross-sectional area of the duct 7 is so reckoned as to ensure the distribution of the solder in good conditions.

The particular arrangement of the fusion chamber 6 in the mass of the heating block 5 ensures rapid melting of the solder and permits it to utilize the heat generated by the resistances 8 with the utmost efficiency.

The solder wire 17 is protected as it progresses through the bore 2 by the insulating lining 4 which sheathes it onto its ingress into the fusion chamber 6 and thereby prevents it from becoming prematurely fused in said bore and from choking it accidentally.

In proportion as the end or tip of the solder wire 17 melts away in the fusion chamber 6, said wire may be fed onwards through the bore 2 by means of a driving device provided for that purpose upon the handle 1.

This driving device comprises, on the one hand, a knurled roller 18 located in a slot 19 through which the bore 2 communicates with the atmosphere and revolubly mounted on a stationary pin 20, and, on the other hand, opposite the roller 18 a second knurled roller or pressure roller 21 located in another slot 22 of the handle 1.

The pressure roller 21 is fitted on the end of a lever 23 pivotally mounted on a stationary pin 24.

The solder wire or cord 17 passes between the two knurled rollers 18, 21 and, owing to the provision of a blade spring 25 secured to the handle 1 and whose end abuts on the lever 23, the said wire or cord is in turn pressed against the roller 18 with a sufficient pressure for permitting a rotation imparted by the operator to said roller in the direction shown by the arrow F to drive the solder wire or cord 17 through the bore 2 towards the block 5.

The roller 18 projects out of the slot 19 so that the operator can easily actuate it, for example with the thumb finger of his hand that holds the handle of the tool. The roller 18 is advantageously positioned adjacent the fore end of the handle 1 to permit easier handling.

According to the further embodiment of the invention shown in Figures 4 to 6, the plug 5ᵇ is dispensed with for permitting the fusion chamber 6 to freely communicate with the atmosphere, whereby the small quantity of fumes or vapors that may evolve from the molten solder can freely escape.

Moreover each of the cheek plates 9 enclosing and holding the electrical resistances 8 has a boss 9ª co-operating with the boss of the companion cheek plate 9 to permit a tight fit of the fore end of the tube 3.

The driving knurled roller 18 projects outside the handle 1 but at an acute angle (see Fig. 5) to that longitudinal axial plane of the tool that intersects the axis of the solder duct 7 at right angles. This arrangement facilitates the manipulation of the soldering-iron since it permits a better and more normal action of the operator's thumb finger on the roller 18 while he is holding the soldering-iron with the same hand, particularly when soldering slanting or undercut work pieces.

In the constructional form shown in Figures 4 to 6, the second roller 21 is dispensed with and the blade spring 25 is secured to the lining 4 and presses directly on the solder wire 17 opposite the point of tangency of the roller 18.

The operation of the soldering-iron as shown in Figures 4 to 6 is substantially the same as the one of the embodiment described with reference to Figures 1 to 3, but the handling is facilitated as above-stated due to the oblique location of the driving roller 18, while the fumes or vapors from the solder that is molten in the chamber 6 freely escape and thus do not risk interference with the proper flow of the molten solder through the duct 7 onto the work piece or to give rise to calamine or dirt that might otherwise clog said duct.

Numerous minor constructional details might of course be changed without departing from the spirit of the invention and the ambit of the subjoined claims.

What I claim is:

1. A soldering-iron comprising, in combination, a handle having an axial bore and a slot extending from its bore, a tube fitted in the bore of the handle and projecting from one of its ends, a block secured to the free end of the tube at an angle thereto and shaped to form a bit, said block having an internal chamber communicating with the tube and extended by a narrow duct formed through the bit, an electrical heater mounted on the block, conductors leading to said heater, and a friction member mounted in the handle slot and projecting out of the handle and into its axial bore for engaging a wire or cord of solder insertable through said bore and said tube.

2. A soldering-iron comprising, in combination, a handle having an axial bore and a short slot extending from its bore, a tube fitted in the bore of the handle and projecting from one of its ends, a block secured to the free end of the tube at an angle thereto and tapered to form a bit, said block having an internal chamber communicating with the tube and extended by a narrow duct formed through the bit, an electrical heater mounted on the block, conductors housed in the handle bore and tube and leading to said heater, and a friction member revolubly mounted in the handle slot and projecting out of the handle and into its axial bore for engaging a wire of solder insertable through said bore and said tube.

3. A soldering-iron comprising, in combination, a handle having an axial bore and a short slot extending from its bore, a tube fitted in the bore of the handle and projecting from its fore end, a block secured to the free end of the tube at right angles thereto and tapered to form a bit, said block having an inner chamber communicating with the tube and extended by a duct of small sectional area formed through the bit, an electrical heater mounted on the block, conductors housed in the handle bore and tube and leading to said heater, a friction member revolubly mounted in the handle slot and projecting out of the handle and into its axial bore, and a pressure member also projecting into said axial bore for co-operating with said revoluble friction member to engage between them a wire of solder insertable through said bore and said tube.

4. A soldering-iron comprising, in combination, a handle having an axial bore end and a short slot adjacent its fore end and extending from its bore, a tube fitted in the bore of the handle and projecting from its fore end, an insulating sheath lining the tube, a block secured to the free end of the tube at right angles thereto and tapered to form a bit, said block having an inner chamber communicating with the tube and extended by a duct of small sectional area formed through the bit, electrical resistances mounted on the block, conductors housed in the handle bore and tube and leading to said resistances, a friction member revolubly mounted in the handle slot and projecting out of the handle and into its axial bore, and a pressure member also projecting into said axial bore for co-operating with said revoluble friction member to engage between them a wire of solder insertable through said bore and said tube.

5. A soldering-iron comprising, in combination, a handle of round cross-section made of insulating material having an axial bore and a short radial slot extending from its bore adjacent its fore end, a tube fitted in the bore of the handle and projecting from its fore end, an insulating sheath internally lining the tube, an internally recessed block tapered to form a bit and secured to the free end of the tube perpendicularly to its axis, said block being set at an angle to the plane of the handle slot, the recess in the block communicating with the tube and being freely opened at one end to the atmosphere and extended at its opposite end by a duct of small sectional area formed through the bit, electrical resistances mounted on both sides of the block, conductors housed in the handle bore and tube and leading to said resistances, a friction roller mounted in the handle slot and projecting out of the handle and into its axial bore, and a springy pressure member also projecting into said axial bore for co-operating with said roller to engage between them a wire of solder insertable through the bore and tube.

6. A soldering-iron comprising, in combination, a handle of round cross-section made of insulating material having an axial bore and a short radial slot extending from its bore adjacent its fore end, a tube fitted in the bore of the handle and projecting from its fore end, an insulating sheath internally lining the tube, an internally recessed metal block tapered to form a bit and secured to the free end of the tube perpendicularly to its axis, said block being set at an acute angle to the plane of the handle slot, the recess in the block communicating with the tube and being freely opened at one end to the atmosphere and extended at its opposite end by a duct of small sectional area formed through the bit, electrical resistances arranged on both sides of the block, cheek plates clamping said resistances to the block, conductors housed in the handle bore and tube and leading to said resistances, a knurled roller mounted in the handle slot and projecting out of the handle and into its axial bore, and a springy pressure member also projecting into said axial bore for co-operating with said roller to engage between them and drive a wire of solder insertable through the bore and tube.

In testimony whereof I affix my signature.

FERNAND DUPAU.